L. BELL.
LIGHT PROJECTOR.
APPLICATION FILED FEB. 19, 1919.
1,438,628.
Patented Dec. 12, 1922
2 SHEETS—SHEET 1.
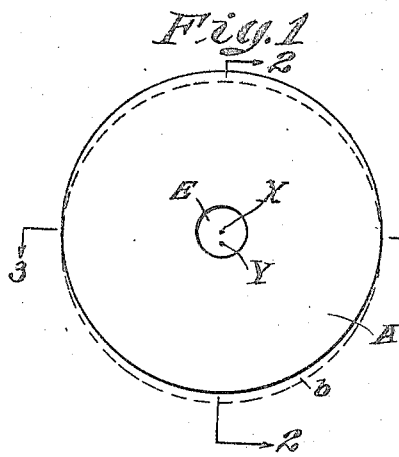
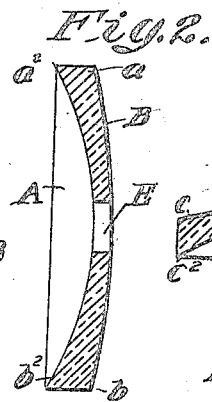
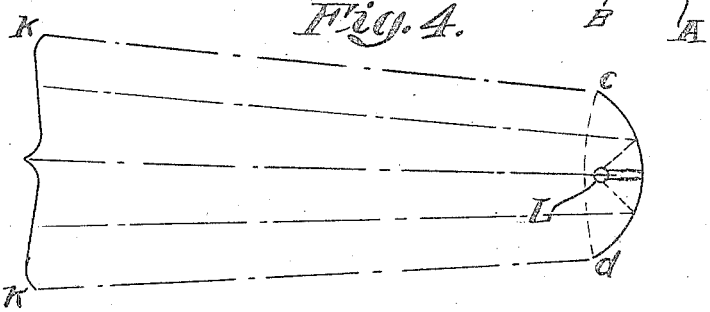
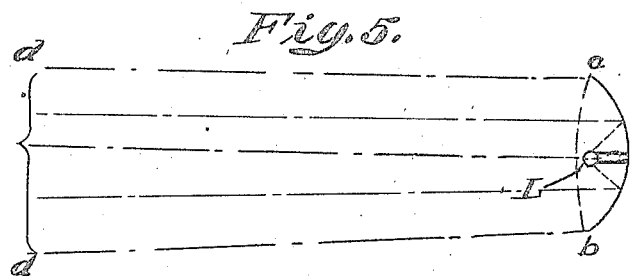
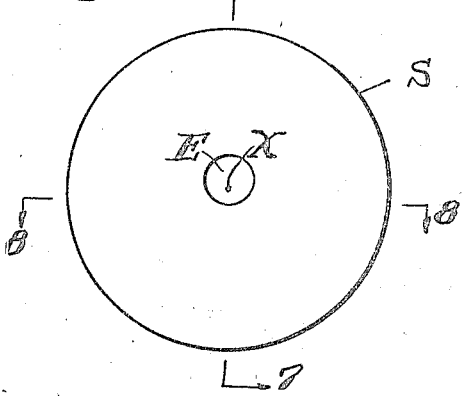
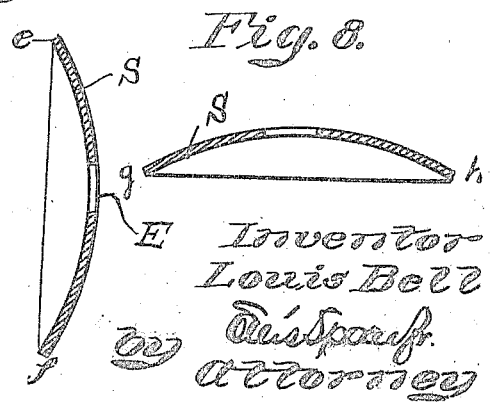
Inventor
Louis Bell
by [Auspach?]
Attorney

L. BELL.
LIGHT PROJECTOR.
APPLICATION FILED FEB. 19, 1919.

1,438,628.

Patented Dec. 12, 1922.
2 SHEETS—SHEET 2.

Inventor
Louis Bell
by Géo. Speak Jr.
Attorney

Patented Dec. 12, 1922.

1,438,628

UNITED STATES PATENT OFFICE.

LOUIS BELL, OF WEST NEWTON, MASSACHUSETTS, ASSIGNOR TO EDWARD N. GODING, TRUSTEE, OF NEWTON, MASSACHUSETTS.

LIGHT PROJECTOR.

Application filed February 19, 1919. Serial No. 277,957.

*To all whom it may concern:*

Be it known that I, LOUIS BELL, a citizen of the United States, residing at West Newton, county of Middlesex, Commonwealth of Massachusetts, have invented certain new and useful Improvements in Light Projectors, of which the following is a specification.

The projection of a beam of light is customarily accomplished by the use of lenses with the light approximately in the focus, or by mirrors, generally paraboloidal, although spherical and other forms have been occasionally employed. Such projection has its limitations both in performance and in production.

It is the object of my present invention to provide projectors of a highly increased range in variety of performance and also of forms capable of accurate commercial production.

It is not infrequently desirable to project a beam of other than circular cross section, as in such lights designed to light up objects over a considerable horizontal angle, for the illumination of signs, for lighting buildings, and for use as automobile headlights, for lighting up a considerable width of roadway without at the same time giving a beam of similar vertical dimension. To meet these ends in my projecting system, I employ a reflecting surface of toroidal shape.

Figure 9:
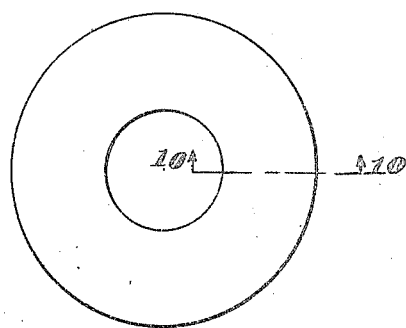
Figure 10:
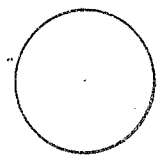

The simplest form of toroidal surface is a portion of a surface generated by the revolution of a circle about a fixed axis lying without its center, in the same plane. The section and plan of a tore so constituted is circular, as shown in Figs. 9 and 10.

Figure 11:
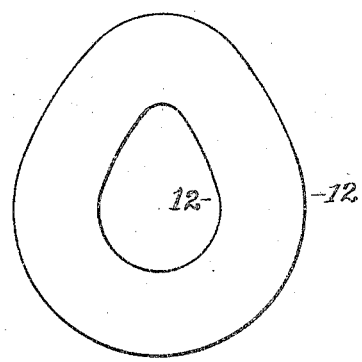
Figure 12:

In cases where notably unsymmetrical distribution of the light is desired, I prefer to use a toroidal surface derived from the generalized tore, in which any regular plane curve is rotated about a fixed axis lying in the same plane, on a radius vector not necessarily constant but which may vary, as the polar coordinate of any desired plane curve. For example, Figs. 11 and 12 show a tore of which the section is an apioid and the plan is likewise an apioid. Similarly from any of the family of Cartesian oval tores may be derived whether alike in plan or section or not. The circular tore is merely an intermediate form of the family.

An ordinary toroidal surface derived from the circular toroid gives from a symmetrically placed source of light a symmetrically distributed beam. Small variations from symmetry can be obtained by decentering the source of light with respect to the surface as hereinafter described, but when it is desirable to obtain wide variations from a symmetrically uniform distribution, such for example as are required to give approximately uniform illumination over a surface not symmetrically disposed with respect to the projecting system, the use of a toroidal surface derived from a non-circular toroid becomes desirable. For example, in flood lighting the facade of a building from a point near the ground level, uniformity of illumination is greatly facilitated by using a toroidal reflector of the non-circular type which of itself would produce a distribution very far from uniform.

My invention lends itself not only to reflecting projectors, but also to projectors of combined reflecting and refracting function such as the Mangin mirror.

As illustrative of the forms which I may employ in the embodiment of my invention, I have selected several characteristic surfaces of reflection for the purpose of illustration, features thereof being indicated by reference characters. In the drawings:

Fig. 1 is a face view of a mirror in accordance with my invention.

Fig. 2 a section on the axis 2—2 of Fig. 1.

Fig. 3 a section on the axis 3—3 of Fig. 1.

Fig. 3ª is a corresponding section to that shown in Fig. 3 of a modification in which the toroid of the rear face is laterally displaced with reference to the front face.

Fig. 4 a diagrammatic view indicating the lateral spread of a projected light beam from a mirror in accordance with my invention.

Fig. 5 is a similar view indicating the substantial vertical symmetry of the sides of such beam.

Fig. 6 a face view of a modified form of my mirror.

Figure 14:
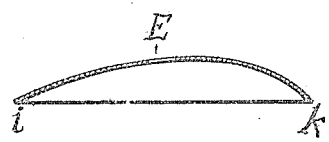
Figure 13:
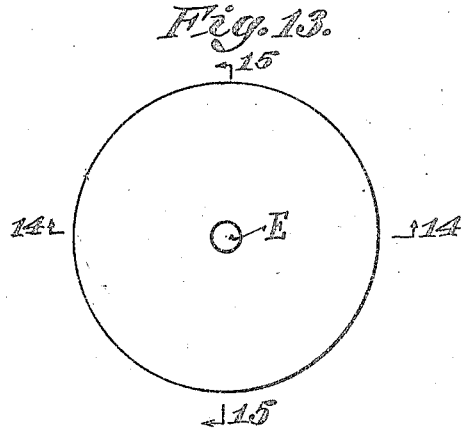

Fig. 7 a section on the line 7—7, Fig. 6.
Fig. 8 a section on the line 8—8, Fig. 6.
Figs. 9 to 12 inclusive, are in order, plans and sections each of a circular tore and an apioidal tore, respectively.
Fig. 13 is a plan of a toric projector of the apioidal type.
Fig. 14 a section on the line 14—14, Fig. 13, and
Fig. 15 a vertical section on the line 15—15, Fig. 13.

In the forms shown I have indicated a reflector adapted to be used with a source of light such as the incandescent bulb as being most practical for ordinary purposes. Such a source of light while not exactly punctiform is sufficiently small with reference to the reflecting surface to give results sufficiently approximate for most purposes of light projection. While in the case of parabolic or spherical mirrors, there is a relatively small focal point corresponding roughly to a conjugate focus somewhere along the axis of symmetry, in these toroidal mirrors the source of light is not conjugate to any point whatever, but only to a surface determined by the form of the toroid.

I prefer for the purpose of more accurate projection to form my reflecting surface as the back B of a mirror of the Mangin type, as shown in Figs. 1, 2 and 3. This surface I form as a toroid having a curvature $a$—$b$ on the line of vertical section 2—2 of Fig. 1, as shown in Fig. 2, and a curvature $c$—$d$ on the line of transverse section 3—3 of Fig. 1 as shown in Fig. 3.

Similarly the front or refracting surface A of this embodiment of my invention is symmetrically toroidal with the rear or reflecting surface B having a curvature $a^2$, $b^2$, on the line of vertical section 2—2 as shown in Fig. 2, and a curvature $c^2$, $d^2$, on the line of transverse section 3—3, as shown in Fig. 2. There is thus a symmetrical correction of the aberrations similar to that in the ordinary spherical form of Mangin mirror.

In case of mirrors of relatively longer radius approximate correction of the aberration is obtainable by a spherical anterior or refracting surface of radius of a length intermediate that of the radius of $a^2$, $b^2$, and $c^2$, $d^2$.

These mirrors are furnished with a central aperture E for the reception of the socket of an incandescent lamp L. As shown in Fig. 5, the filament of this lamp L is approximately in focus for the surface of vertical axis of the surface B taking into account the refractive effect of the anterior surface A. It therefore causes so far as the vertical axis is concerned a substantially parallel beam $a$, $d$—$f$, $d$, as indicated in Fig. 5.

In the horizontal axis rays from the source of light L are incident upon the reflecting surface B, at the points $c$, $d$ and correspondingly upon these points, taking into account the refractions on the anterior surface A the resulting beam $c$, $k$—$d$, $k$ is spread in the horizontal direction as shown in Fig. 4.

The result of this distribution therefore is a beam as a whole of oval section, covering much greater width than height, or much greater height than width if turned ninety degrees. It may therefore in the first position spread laterally to considerable area, or in the second position spread vertically to cover towers, steeples and the like.

In the use of such a light projecting system, the toroidal curves of my construction are easily ground accurately by automatic machinery, much more easily than paraboloidal or other surfaces varying from the sphere so that the resulting mirror is substantially as easy to produce as the ordinary spherical Mangin mirror.

In the somewhat modified form of my invention shown in Figs. 6 to 8, I have indicated an embodiment of my invention in a single surface type of reflector shown in the face view in Fig. 6. The surface of this reflector S which may be a metallic reflector or reflector of any well known type, is a toroidal surface having a vertical curvature $e$, $f$, indicated in the section, taken on the line 7—7 of Fig. 6. This curvature of axis at right angles thereto is as appears in the section in Fig. 8, along the line $g$—$h$ which is the section on line 8—8 of Fig. 6.

Where it is desirable to pitch the light downward with such a projector as is shown in Figs. 6 to 8, this is easily accomplished without material disturbance of the functions of the reflecting system by a slight decentering of the source of the light upwards from the diametrical center of the reflector.

As shown in Fig. 6, where the lamp opening E has its center slightly above the intersection of the two optical axes of symmetry. The result is similar to the performance of the projector shown in Fig. 1, where the center of the perforation is in the center X of the mirror face as a whole, while the curvature of the rear reflecting toroidal surface B is displaced downwardly so that its horizontal axis passes through Y below the mirror center X.

In such construction, the oval beam of the projected light, $a$, $d$—$b$, $d$, dips slightly downward relative to the horizontal as shown in Fig. 5.

For concurrent lateral symmetry of distribution the source of light may be shifted from the optical center laterally as well as vertically, either by actually displacing the lamp itself relative to the toroid, or in the Mangin type by displacing the rear toroidal curvature with respect to the source of light, so as to bring the intersection of the planes of the symmetry of the concurrent cylindricities to the desired point of displacement relative to the source of light as indicated in Fig. 3ª.

Figure 15:
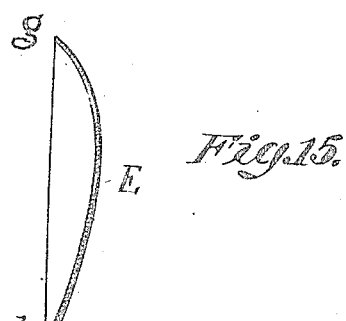

The tores involved in Figs. 1 and 6 are circular and the manipulation of the beam by decentering is characteristic of this group of my projectors. It is now necessary to consider the modification of form and distribution in a projected beam in that class of my projectors heretofore mentioned in which the surface belongs to the non-circular type of tore. For the purposes of a better appreciation of the relations of these surfaces reference may be had to Figs. 9 to 12 inclusive. Fig. 9 is a plan view of a circular tore of circular section as indicated in Fig. 10. In Fig. 11 I have indicated a tore of apioidal plan and also apioidal section as indicated in Fig. 12. By considering the relationship of these two types of tore the relation of my projector shown in Figs. 13 to 15 to the forms first described will be apparent. The projector shown in plan in Fig. 13 has a vertical section as appears in Fig. 15 representing a curvature $g$—$h$, while a cross section as on the line 14—14 it has a curvature $i$—$k$.

In practice the general type of tore to be selected will be apparent to those skilled in the art from the above disclosures. In this way any desired distribution of illumination over any surface from any point or points at which projectors may be installed, may be had by employing projectors of surface in accordance with my invention.

What I therefore claim and desire to secure by Letters Patent is:

1. In a light projector, a light projecting mirror of transparent material formed with a toroidal silvered back, and having a toroidal anterior surface with axes parallel with the axes of the rear toroid but respectively of shorter radius of curvature.

2. In a light projector, a light projecting mirror of transparent material formed with a toroidal silvered back, and having a toroidal anterior surface with axes parallel respectively with the axes of the rear toroid but respectively of shorter radius of curvature, such radii of curvature being proportioned to the refractive index of the transparent material so as to effect approximate correction of the aberration.

3. A mirror of transparent material having a toroidal reflecting rear surface and a toroidal front refracting surface of axes respectively parallel with the axes of the rear toroid and of curvatures modifying the light distribution determined by the rear reflecting surface.

4. A light projecting reflector of transparent material having a toroidal rear surface of reflection, and a toroidal front surface of refraction, said toroidal surfaces being of curvatures interrelated each to supplement the aberrative tendency of the other.

5. A light projecting reflector of transparent material having a toroidal rear surface of reflection and a front refracting surface of revolutions whose axis is non-coincident with either of the axes of the toroidal reflecting surface.

In testimony whereof I affix my signature in presence of two witnesses.

LOUIS BELL.

Witnesses:
GEO. B. RAWLINGS,
CAROLYN G. LOWDEN.